July 2, 1929.　　　G. H. GREIMAN　　　1,719,328
BUCKET UNLOADING DEVICE FOR EXCAVATORS
Filed Feb. 11, 1928
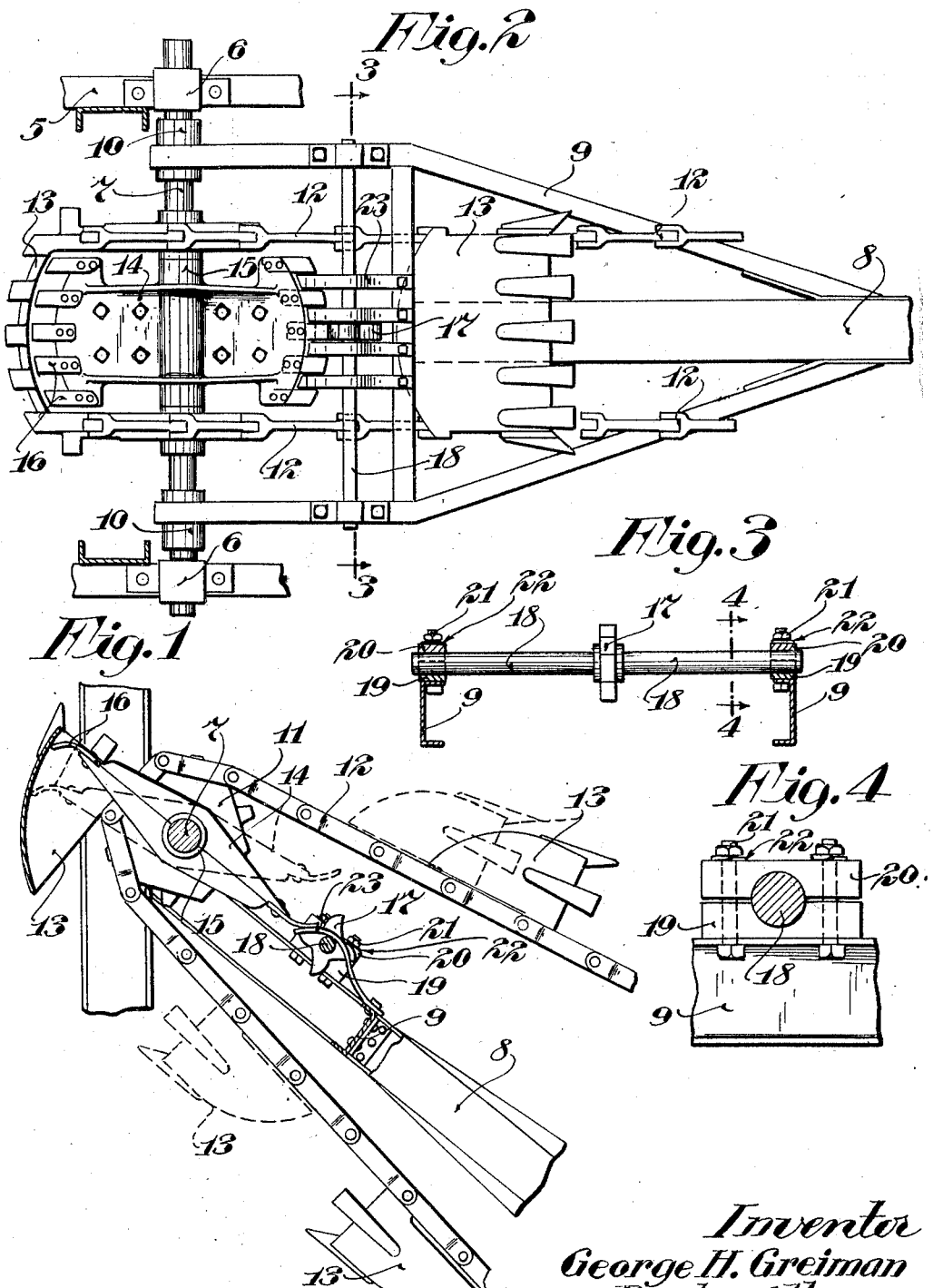
Inventor
George H. Greiman
By his Attorneys Patented July 2, 1929.

1,719,328

UNITED STATES PATENT OFFICE.

GEORGE H. GREIMAN, OF GARNER, IOWA.

BUCKET-UNLOADING DEVICE FOR EXCAVATORS.

Application filed February 11, 1928. Serial No. 253,692.

My present invention has for its object to provide a simple and highly efficient unloading device for the shovels, buckets, spades or scoops of power-driven excavators, and to this end, it consists of the novel devices and combinations of devices hereinafter described and defined in the claims.

The present invention, from a broad point of view, is in the nature of an improvement or refinement of the cleaning device disclosed and broadly claimed in my United States Letters Patent No. 1,449,224, of date March 20, 1923, entitled "Cleaning scraper for excavators".

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view showing the improved unloading device applied to a trencher in position to unload the buckets thereof;

Fig. 2 is a plan view of the parts shown in Fig. 1;

Fig. 3 is a view partly in elevation and partly in section, taken on the line 3—3 of Fig. 2; and Fig. 4 is a fragmentary detail view with some parts sectioned on the line 4—4 of Fig. 3, on an enlarged scale.

The main frame of the trencher illustrated is indicated by the numeral 5, and on the rear portion thereof is a pair of transversely aligned bearings 6 in which a power-driven shaft 7 is journaled. The vertically oscillating boom 8 of the trencher has, at its upper or inner end portion, a frame 9 rigidly secured thereto. This frame 9 is provided with bearings 10 pivoted on the shaft 7 to move concentrically about the axis thereof. A pair of laterally spaced sprocket wheels 11 are secured to the shaft 7 for rotation therewith and, as shown, are of polygonal form.

The excavator belt 12 is in the form of sprocket chains arranged to run over sprocket wheels 11 on the shaft 7 and over similar sprocket wheels, not shown, mounted on the free or lower end of the boom 8. The excavator belts 12 carry tooth-equipped buckets 13 of the type that pick up the load at their front edges and discharge the same at their rear edges at the time said buckets make the upward turning movement around the shaft 7 and sprocket wheels 11.

The unloading device for the buckets 13, which is the subject-matter of the present invention, comprises a pair of relatively wide cast arms 14 having an intermediate hub 15. This hub 15 is loosely mounted on the shaft 7 between the sprocket wheels 11, and is held by said wheels against endwise movement. As shown, the arms 14 are formed in two sections rigidly bolted together and provided at their opposite ends with scoops 16 rigidly bolted thereto and each comprising a plurality of edgewise spaced fingers. These scoops 16 are located diametrically opposite to each other and are so projected from the shaft 7 that one thereof is always operative to unload the upwardly moving buckets 13.

The bucket-unloading device, as shown in the drawings, is in an operative position in which the left-hand scoop 16 is positioned for unloading action, while the right-hand scoop 16 engages a stop device and holds the arms 14 from turning about the axis of the shaft 7. This stop device includes a star wheel 17, the teeth of which afford stop surfaces for the inactive scoop 16. Said wheel 17 is rigidly secured to a shaft 18, which extends parallel to the shaft 7 and is journaled in a pair of aligned bearings 19 having displaceable caps 20, and which bearings and caps are secured to the frame 9 by nut-equipped bolts 21. These caps 20 are out of contact with the bearings 19 and the bolts 21 hold said caps under sufficient pressure to normally frictionally hold the shaft 7 from turning. Spring washers 22, encircling the bolts 21, are interposed between the heads of said bolts and the caps 20.

The frictional contact between the shaft 18 and the bearings 19 and their caps 20 is such that the yielding stop device described will hold the unloading device in working position with sufficient force to unload the buckets 13 of dirt or even heavy clay, but with less pressure than that which would be liable to break any of the parts of the machine in case a rock or the like should be caught between one of the buckets 13 and the active scoop 16. Hence, it, of course, follows that in case a rock or the like should be caught between one of the buckets 13 and the active scoop 16, the force thus produced would overcome the frictionally held shaft 7, move the arms 14 and cause the inactive scoop 16 to rotate the wheel 17 by its engagement with one of the teeth thereof, and move the same into a position to clear said inactive scraper blade and release the same. When this releasing action takes place, the next following tooth on the wheel 17 will be positioned to be engaged as a stop by the next following or active scoop 16, after having been rotated 180°.

The released unloading device, by its contact with the obstruction in the respective bucket 13, will be carried thereby and the arms 14 rotated on the shaft 7, until the respective bucket 13 moves out of the arc of the circle in which the unloading device is moved, and thereby release said scoop. By the time the active scoop has been released from the bucket, the inactive scoop will have been carried into the path of movement of the next following bucket 13 and be carried thereby until the active scoop 16 engages the tooth on the wheel 17, which projects in its path of movement.

Stripper bars 23 for the scoops 16 have one of their ends rigidly secured to the frame 9 and rest on the shaft 7 as an intermediate support with their free end portions extending below the inactive scoop 16 and in its path of movement. These stripper bars 23 are so arranged that the fingers of the inactive scoop 16, when released by the wheel 17 and the unloading device, is rotated about its axis, pass therebetween and clear themselves of any dirt, clay or other obstruction that may adhere thereto. The frictional pressure applied to the shaft 7 may be so adjusted that the unloading device will be quite frequently released from the stop wheel 17 and rotated so as to clean the scoops 16 by causing the same to pass between the stripper bars 23.

What I claim is:

1. In an excavating machine, the combination with a bucket-equipped excavator belt, of a rotary bucket-unloading device having a pair of scoops adapted to be operatively positioned in succession, and a rotatable stop normally operative on the inactive scoop and adapted to move and clear the same under excessive pressure and be reset by said inactive scoop for the next following scoop.

2. In an excavating machine, the combination with a bucket-equipped excavator belt, of a rotary bucket-unloading device having a pair of scoops adapted to be operatively positioned in succession, and a frictionally held rotatable stop normally operative on the inactive scoop and adapted to move and clear the same under excessive pressure and be reset by said inactive scoop for the next following scoop.

3. In an excavating machine, the combination with a bucket-equipped excavator belt, of a rotary bucket-unloading device having a pair of scoops adapted to be operatively positioned in succession, and a frictionally held rotatable wheel having stop surfaces, one of which is normally operative on the inactive scoop, said wheel being adapted to be moved under excessive pressure produced by the inactive scoop on the engaged stop surface and cause said stop surface to release the inactive scoop and position the next following stop surface for the next following scoop.

4. In an excavating machine, the combination with a bucket-equipped excavator belt, of a rotary bucket-unloading device having a pair of scoops adapted to be operatively positioned in succession, a rotatable wheel, and means for producing a variable friction on the wheel, said wheel having stop surfaces, one of which is normally operative on the inactive scoop, said wheel being adapted to be moved under excessive pressure produced by the inactive scoop on the engaged stop surface and cause said stop surface to release the inactive scoop and position the next following stop surface for the next following scoop.

5. The structure defined in claim 4 in which the stop surfaces on the wheel are in the form of circumferentially spaced teeth.

6. In an excavating machine, the combination with a bucket-equipped excavator belt, of a rotary bucket-unloading device having a pair of scoops adapted to be operatively positioned in succession, a shaft, bearings in which the shaft is rotatably mounted, means for adjusting the bearings on the shaft to frictionally hold the same, and a wheel on the shaft having stop surfaces, one of which is normally operative on the inactive scoop, said shaft being adapted to be moved under excessive pressure produced by the inactive scoop on the engaged stop surface and cause said stop surface to release the inactive scoop and position the next following stop surface for the next following scoop.

7. In an excavating machine, the combination with a bucket-equipped excavator belt, of a rotary bucket-unloading device having a pair of scoops adapted to be operatively positioned in succession, a shaft, bearings in which the shaft is rotatably mounted, means for adjusting the bearings on the shaft to frictionally hold the same under a variable and yielding pressure, and a wheel on the shaft having stop surfaces, one of which is normally operative on the inactive scoop, said shaft being adapted to be moved under excessive pressure produced by the inactive scoop on the engaged stop surface and cause said stop surface to release the inactive scoop and position the next following stop surface for the next following scoop.

8. In an excavating machine, the combination with a bucket-equipped excavator belt, of a rotary bucket-unloading device having a pair of scoops adapted to be operatively positioned in succession, each of the scoops comprising a plurality of edgewise spaced fingers, a movable stop normally operative on the inactive scoop and adapted to move and clear the same under excessive pressure, and stripper bars through which the fingers of one of the scoops pass when the unloading device is released by the stop and rotated about its axis.

9. In an excavating machine, the combination with a bucket-equipped excavator belt, of a rotary bucket-unloading device having a pair of scoops adapted to be operatively positioned in succession, each of the scoops comprising a plurality of edgewise spaced fingers, a rotatable shaft, a wheel on the shaft having stop surfaces, friction means operative on the shaft and normally holding the same, one of said stop surfaces being normally operative on the inactive scoop, said shaft being adapted to be moved under excessive pressure produced by the inactive scoop on said stop surface and cause said stop surface to release the inactive scoop and position the next following stop surface of the next following scoop, and anchored stripper bars resting on the shaft as an intermediate support and between which bars the fingers of the inactive stop move when released by the engaged stop surface and the unloading device rotated about its axis.

In testimony whereof I affix my signature.

GEORGE H. GREIMAN.